(12) United States Patent
Soni et al.

(10) Patent No.: US 11,100,164 B2
(45) Date of Patent: Aug. 24, 2021

(54) DISPLAYING VIDEOS BASED UPON SELECTABLE INPUTS ASSOCIATED WITH TAGS

(71) Applicant: Oath Inc., New York, NY (US)

(72) Inventors: Akshay Soni, San Jose, CA (US); Aasish Kumar Pappu, Jersey City, NJ (US)

(73) Assignee: Verizon Media Inc., New York, NY (US)

( * ) Notice: Subject to any disclaimer, the term of this patent is extended or adjusted under 35 U.S.C. 154(b) by 236 days.

(21) Appl. No.: 16/006,076

(22) Filed: Jun. 12, 2018

(65) Prior Publication Data

US 2019/0377826 A1 Dec. 12, 2019

(51) Int. Cl.
| | |
|---|---|
| *G06F 7/00* | (2006.01) |
| *G06F 16/783* | (2019.01) |
| *G06F 3/0482* | (2013.01) |
| *G06F 16/738* | (2019.01) |
| *G06F 16/74* | (2019.01) |
| *G06F 16/78* | (2019.01) |
| *G06F 16/2457* | (2019.01) |

(52) U.S. Cl.
CPC ........ *G06F 16/7834* (2019.01); *G06F 3/0482* (2013.01); *G06F 16/24578* (2019.01); *G06F 16/738* (2019.01); *G06F 16/743* (2019.01); *G06F 16/7867* (2019.01)

(58) Field of Classification Search
CPC .. G06F 16/7834; G06F 16/743; G06F 16/738; G06F 16/7867; G06F 16/24578; G06F 3/0482; G06F 3/167; H04N 21/23418; H04N 21/26603; H04N 21/4316; H04N 21/4394; H04N 21/44008
See application file for complete search history.

(56) References Cited

U.S. PATENT DOCUMENTS

| | | | | |
|---|---|---|---|---|
| 8,214,374 | B1 * | 7/2012 | Acharya | G06F 16/7834 707/748 |
| 2007/0112837 | A1 * | 5/2007 | Houh | G06F 16/41 |
| 2013/0051754 | A1 * | 2/2013 | Gilpin | H04N 21/8456 386/241 |
| 2015/0293996 | A1 * | 10/2015 | Liu | G06F 16/7844 707/723 |
| 2019/0332899 | A1 * | 10/2019 | Jones | G06K 9/6267 |

* cited by examiner

*Primary Examiner* — Azam M Cheema
(74) *Attorney, Agent, or Firm* — Cooper Legal Group, LLC

(57) ABSTRACT

One or more computing devices, systems, and/or methods for displaying videos based upon selectable inputs associated with tags are presented. For example, a video may be identified. A transcript, associated with the video, may be determined. The transcript may comprise a plurality of text segments. The transcript may be analyzed to generate a plurality of sets of tags associated with the transcript. A plurality of selectable inputs may be generated based upon the plurality of sets of tags. A video interface, comprising the plurality of selectable inputs, may be displayed on a first device. A selection of a first selectable input may be received via the video interface. The first selectable input may be associated with a first tag of the plurality of sets of tags and a first time of the video. A second device may display the video based upon the first time of the video.

20 Claims, 9 Drawing Sheets

VIDEO INTERFACE-BACKEND

IDENTIFY VIDEO — 516

TITLE: OUR INTERNATIONAL TRIP
DURATION: 00:10:38

DETERMINE TRANSCRIPT — 518

00:00:04 → 00:00:12  We began our journey in Africa

00:00:13 → 00:00:20  From the food to the museums, Africa was an incredible experience 00:00:21 → 00:00:34  First, we tried all the foods Ethiopia had to offer 00:00:35 → 00:00:40  Ethiopian cuisine is certainly a treat

IDENTIFY PLURALITY OF SETS OF ENTITIES: — 520
    TEXT SEGMENT 1: Journey, Africa
    TEXT SEGMENT 2: Food, Museums, Africa
    TEXT SEGMENT 3: Ethiopian Food
    TEXT SEGMENT 4: Ethiopian Cuisine

⋮

IDENTIFY PLURALITY OF SETS OF TOPICS: — 522
    TEXT SEGMENT 1: Africa Tourism
    TEXT SEGMENT 2: Travel destinations, Africa Tourism
    TEXT SEGMENT 3: Cuisine
    TEXT SEGMENT 4: Cuisine

⋮

GENERATE SELECTABLE INPUTS

FIG. 5B

DISPLAYING VIDEOS BASED UPON SELECTABLE INPUTS ASSOCIATED WITH TAGS

BACKGROUND

Many services, such as websites, applications, etc. may provide platforms for viewing media, such as videos. For example, a user may interact with a service. A list of videos may be presented to the user while interacting with the service. The user may be interested in (viewing) a video of the list of videos. However, the user may (merely) be interested in viewing a segment of the video associated with one or more subjects that the user is interested in. It may be difficult and/or it may take a substantial amount of time for the user to determine which portion of the video comprises the segment associated with the one or more subjects.

SUMMARY

In accordance with the present disclosure, one or more computing devices and/or methods are provided. In an example, a video (e.g., a news channel video clip, an educational video clip, etc.) may be identified. The video may comprise video data (e.g., a visual component of the video) and audio data (e.g., an audio component of the video). A transcript associated with the audio data may be determined. The transcript may comprise a plurality of text segments. Each text segment may be associated with a time segment of a duration of time of the video. The transcript may be analyzed to generate a plurality of sets of tags (e.g., President, Politics, etc.) associated with the transcript. Each set of tags of the plurality of sets of tags may correspond to a text segment of the plurality of text segments. A plurality of selectable inputs (e.g., electronic buttons, selectable graphical objects, selectable text objects, etc.) may be generated based upon the plurality of sets of tags. Each selectable input of the plurality of selectable inputs may correspond to an indication of a tag of the plurality of sets of tags and a time associated with the tag. A first graphical user interface of a first client device may be controlled to display a video interface comprising the plurality of selectable inputs. A selection of a first selectable input of the plurality of selectable inputs may be received via the video interface. The first selectable input may be associated with a first tag of the plurality of sets of tags and a first time of the video. Responsive to receiving the selection of the first selectable input, a second graphical user interface of a second client device may be controlled to display the video. The video may be displayed based upon the first time of the video.

In an example, a plurality of selectable inputs may be generated based upon a plurality of sets of tags associated with a video. Each selectable input of the plurality of selectable inputs may correspond to an indication of a tag of the plurality of sets of tags and a time associated with the tag. A first graphical user interface of a first client device may be controlled to display a video interface comprising the plurality of selectable inputs. A selection of a first selectable input of the plurality of selectable inputs may be received via the video interface. The first selectable input may be associated with a first tag of the plurality of sets of tags and a first time of the video. Responsive to receiving the selection of the first selectable input, a second graphical user interface of a second client device may be controlled to display the video. The video may be displayed based upon the first time of the video.

In an example, a video may be identified. The video may comprise video data and audio data. A transcript associated with the audio data may be determined. The transcript may comprise a plurality of text segments. Each text segment may be associated with a time segment of a duration of time of the video. The transcript may be analyzed to generate a plurality of sets of tags associated with the transcript. Each set of tags of the plurality of sets of tags may correspond to a text segment of the plurality of text segments. A plurality of selectable inputs may be generated based upon the plurality of sets of tags. Each selectable input of the plurality of selectable inputs may correspond to an indication of a tag of the plurality of sets of tags and a time associated with the tag.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5B is a component block diagram illustrating an example system for displaying videos based upon selectable inputs associated with tags, where a backend system generates a plurality of selectable inputs responsive to a first video being uploaded to one or more servers and/or to a video database.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
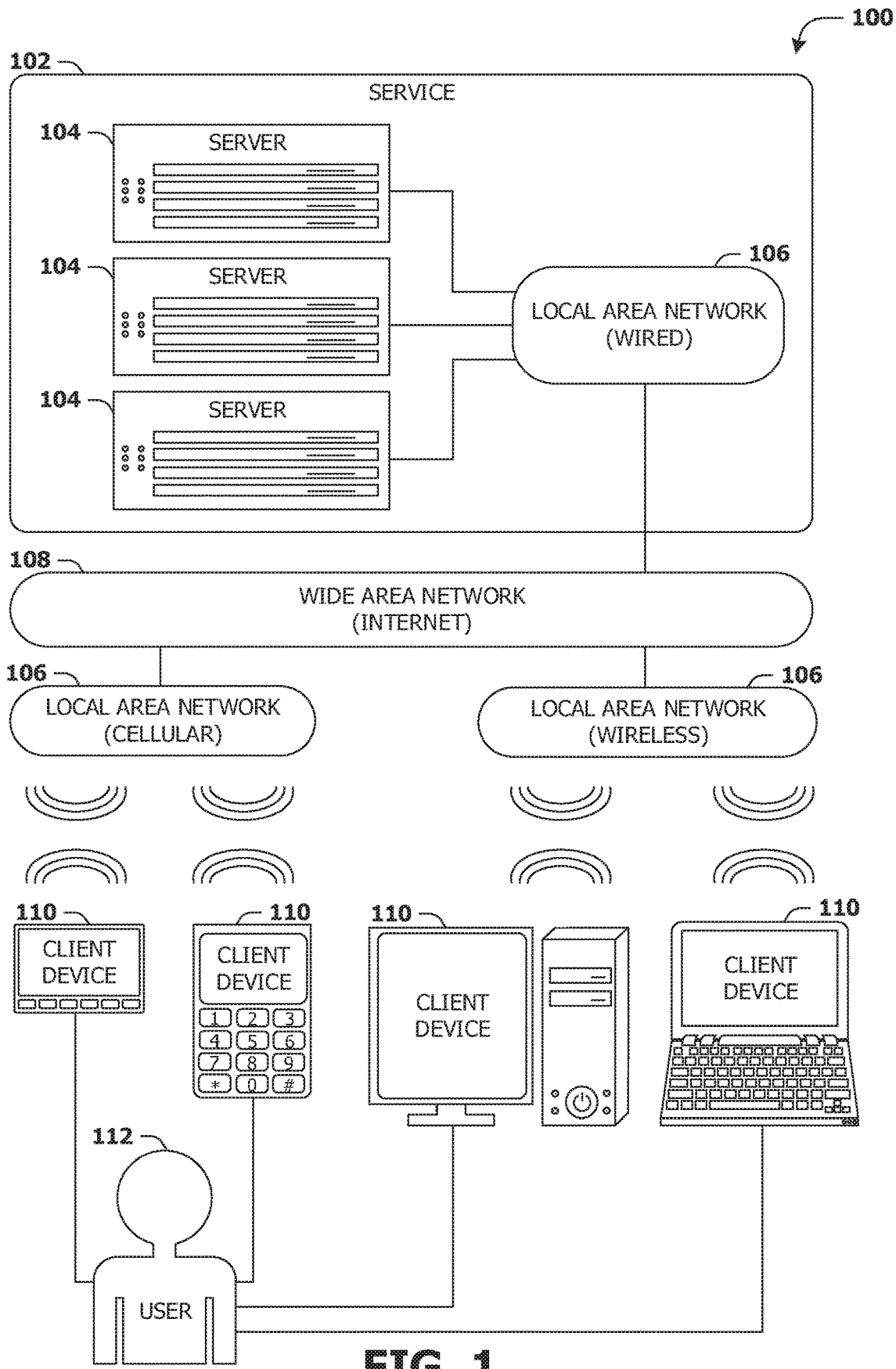
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
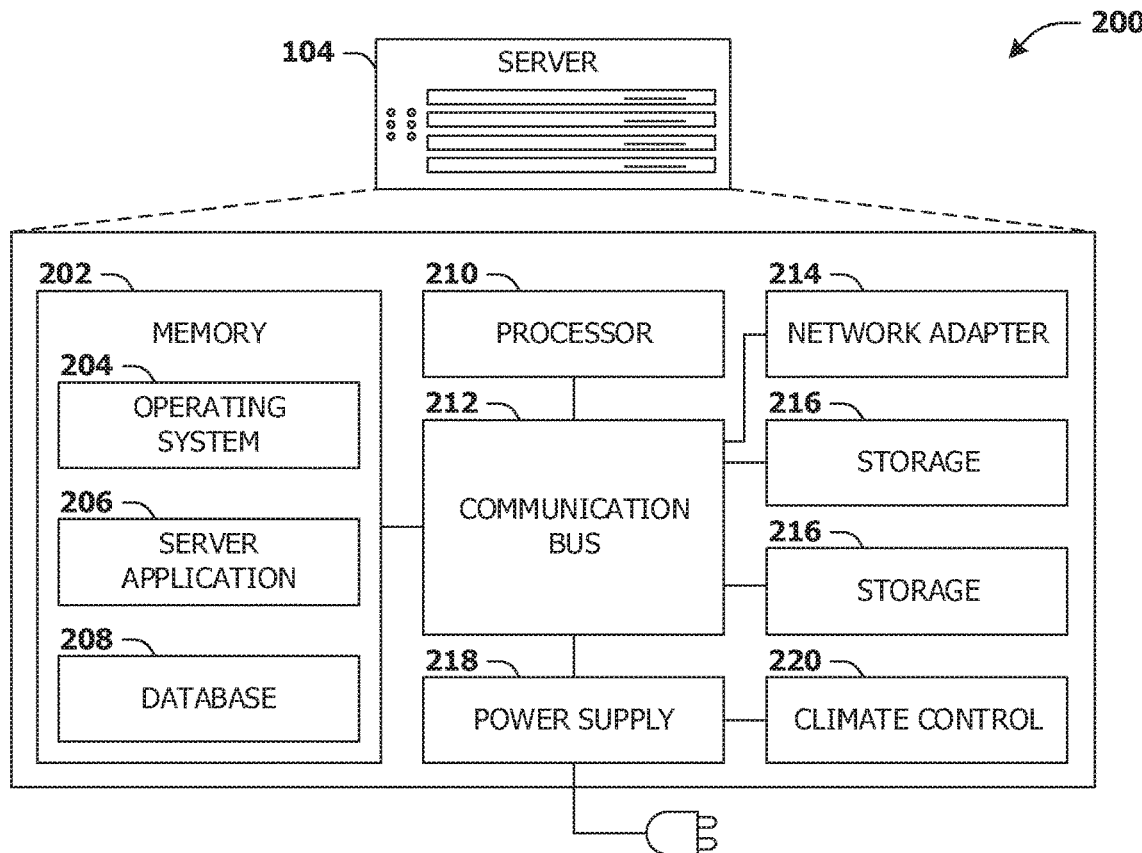
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
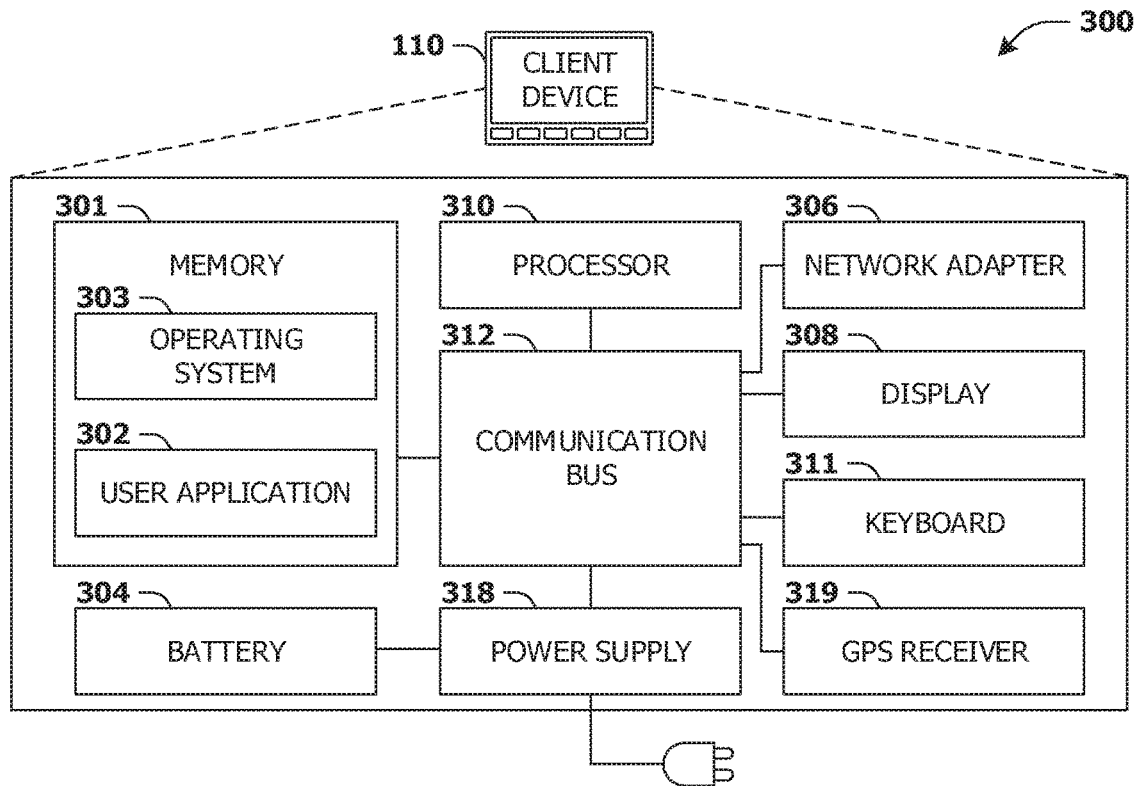
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices, systems, and/or techniques for displaying videos based upon selectable inputs associated with tags are presented. For example, a user (and/or a device associated with the user) may access and/or interact with a service, such as a website, an application, etc. that provides a platform for viewing and/or downloading videos from a server (of the website, the application, etc.). For example, the user may be interested in consuming a video (e.g., a news channel video clip, an educational video clip, etc.). However, the user may (merely) be interested in consuming one or more portions of the video associated with one or more topics and/or one or more entities (e.g., the user may have an interest in the one or more topics and/or the one or more entities). It may be difficult and/or it may take a substantial amount of time for the user to find the one or more portions of the video (associated with the one or more topics and/or the one or more entities). Accordingly, the user may be unable to find the one or more portions of the video and/or the user may spend a considerable amount of time waiting for the one or more portions of the video and/or finding the one or more portions of the video (e.g., by manually skipping through sections of the video).

Thus, in accordance with one or more of the techniques presented herein, a transcript associated with audio data of the video may be determined. The transcript may be analyzed to generate a plurality of sets of tags (e.g., President, Politics, etc.) associated with the transcript. A plurality of selectable inputs (e.g., electronic buttons, selectable graphical objects, selectable text objects, etc. representative of President, Politics, etc.) may be generated based upon the plurality of sets of tags. The plurality of selectable inputs may be displayed via the device (associated with the user). A first selectable input of the plurality of selectable inputs (e.g., the first selectable input may be associated with the one or more topics and/or the one or more entities that the user is interested in) may be selected. Responsive to the selection of the first selectable input, the video may be displayed based upon a first time of the video associated with the first selectable input (e.g., the first time may be associated with the one or more topics and/or the one or more entities that the user is interested in).

Figure 4:
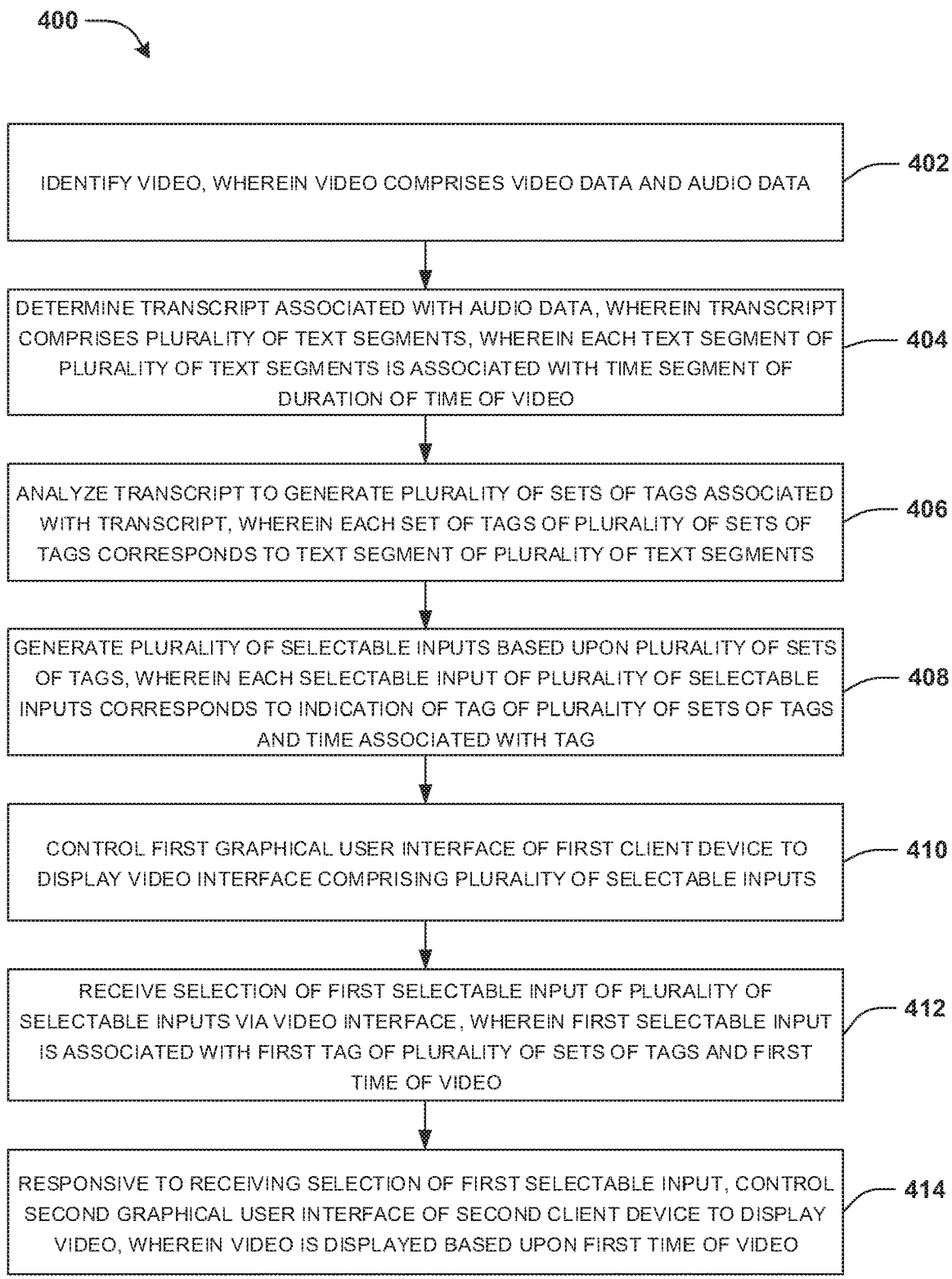
FIG. 4 is a flow chart illustrating an example method for displaying videos based upon selectable inputs associated with tags.

An embodiment of displaying videos based upon selectable inputs associated with tags is illustrated by an example method 400 of FIG. 4. A user, such as user Jill, and/or a device associated with the user) may access and/or interact with a service, such as a website, an application, etc. that provides a platform for viewing and/or downloading videos from a server (of the website, the application, etc.). For example, a graphical user interface of the device may be controlled to display a video interface comprising a list of videos that may be accessed, viewed and/or downloaded via the video interface.

At 402, a first video may be identified. For example, the first video may be identified from a video database associated with the service. In some examples, the first video may be identified responsive to a selection of the first video (via the video interface) by one or more users (and/or one or more devices associated with the one or more users). Alternatively and/or additionally, the first video may be identified responsive to receiving the first video. For example, the first video may be identified responsive to the first video being uploaded to the video database (and/or being uploaded to one or more servers associated with the service) by one or more users (and/or one or more devices associated with the one or more users), an administrator, etc.

The video database may be stored in the one or more servers (associated with the service). The video database may comprise a data structure corresponding to a plurality of videos. The data structure may comprise the plurality of videos and/or a plurality of sets of information. Each set of information of the plurality of sets of information may correspond to a video of the plurality of videos. Each set of information of the plurality of sets of information may comprise a title (e.g., a name) of a video of the plurality of videos, an indication of a duration of time of the video, a description of subject matter of the video, a transcript of the video, etc.

In some examples, the first video may be a news-related video (e.g., a news channel video clip, an internet news video clip, etc.). Alternatively and/or additionally, the first video may be an instructional video (e.g., a how-to video clip, an educational video clip, etc.). Alternatively and/or additionally, the first video may be an interview-related video (e.g., a documentary video clip, a video clip of a meeting, etc.). Alternatively and/or additionally, the first video may be a different type of video (e.g., a sports-related video clip, an entertainment-related video clip, etc.).

The first video may comprise video data (e.g., a visual component of the first video) and audio data (e.g., an audio component of the first video). At 404, a transcript may be determined associated with the audio data (of the first video). In some examples, the transcript may comprise text representative of words and/or sounds of the audio data. In some examples, the transcript may comprise a plurality of text segments. Each text segment of the plurality of text segments may be associated with a time segment of a duration of time of the first video. In some examples, the transcript may comprise a set of captions and/or a set of subtitles associated with the first video.

In some examples, each text segment of the plurality of text segments may comprise one sentence of the audio data. Alternatively and/or additionally, each text segment of the plurality of text segments may comprise a plurality of sentences of the audio data. For example, the transcript may be divided into the plurality of text segments based upon a number of sentences (e.g., 1 sentence, 2 sentences, 3, sentences, etc.) (corresponding to each text segment of the plurality of text segments).

Alternatively and/or additionally, each text segment of the plurality of text segments may comprise words and/or sounds of the audio data associated with a second duration of time. For example, each text segment of the plurality of text segments may be associated with a time segment having the second duration of time. For example, the transcript may be divided into the plurality of text segments based upon the second duration of time.

A first text segment may be representative of words and/or sounds of the audio data during a first time segment of the duration of time of the first video. In some examples, the first text segment may comprise text representative of the words and/or the sounds of the audio data during the first time segment. Alternatively and/or additionally, the first text segment may (merely) comprise text representative of the words of the audio data during the first time segment. For example, the first text segment may comprise: "The President made a big decision today related to jobs".

Alternatively and/or additionally, the first text segment may comprise one or more indications of the first time segment. For example, the first text segment may comprise: "00:00:03→00:00:11", indicating that the first text segment corresponds to the words and/or the sounds of the audio data from a first time of the first video (e.g., 00:00:03, 3 seconds into the first video, etc.) to a second time of the first video (e.g., 00:00:11, 11 seconds into the first video, etc.). The first time of the first video may correspond to a beginning of the first time segment and/or the second time of the first video may correspond to an end of the first time segment. Alternatively and/or additionally, the first text segment may (merely) comprise the first time or the second time (rather than both the first time and the second time).

Alternatively and/or additionally, the first text segment may comprise one or more indications of a person and/or a title of the person that spoke the words and/or the sounds of the audio data during the first time segment. For example, the first text segment may comprise: "Newscaster 1:".

Alternatively and/or additionally, the first text segment may comprise the one or more indications of the first time segment, the one or more indications of the person and/or the title of the person that spoke the words and/or the sounds of the audio data during the first time segment, and/or text representative of the words and/or the sounds of the audio data during the first time segment. For example, the first text segment may comprise: "00:00:03→00:00:11 Newscaster 1: The President made a big decision today related to jobs".

In some examples, the transcript may be retrieved from (the plurality of sets of information of) the video database. Alternatively and/or additionally, the first video may comprise the transcript (as part of the first video, embedded within the first video, etc.). Accordingly, the transcript may be retrieved from (within) the first video.

Alternatively and/or additionally, the transcript may not be available (in the video database and/or the first video). Accordingly, the audio data of the first video may be transcribed to generate the transcript. For example, the first video may be transcribed (e.g., automatically) by using speech recognition (e.g., automatic speech recognition) techniques and/or other techniques. Alternatively and/or additionally, the first video may be transcribed manually.

At 406, the transcript may be analyzed to generate a plurality of sets of tags associated with the transcript. For example, each set of tags of the plurality of sets of tags corresponds to a text segment of the plurality of text segments. For example, the plurality of sets of tags may comprise indications a plurality of sets of entities and/or indications of a plurality of sets of topics.

In some examples, the plurality of sets of entities (e.g., named entities) may comprise subjects (expressed, discussed, etc.) in the first video. For example, the plurality of sets of entities may comprise places (e.g., countries, cities, geographic locations, etc.), people (e.g., people of a particular location, people with a particular occupation, politicians, celebrities, socialites, etc.), things (e.g., devices, natural objects, etc.), organizations, ideas, systems, events, historical events, current events, abstract objects, physical objects, etc.

In some examples, the transcript may be analyzed to identify the plurality of sets of entities. Each set of entities of the plurality of sets of entities may correspond to a text segment of the plurality of text segments. In some examples, the plurality of sets of entities may be identified by comparing each text segment of the plurality of text segments to one or more information databases. For example, text segments of the plurality of text segments may be compared with one or more first resources (e.g., an encyclopedia, an online encyclopedia, a news channel, a news website, a website, a book, a research article, a research article database and/or a different type of information database, etc.) to identify the plurality of sets of entities. Alternatively and/or additionally, the transcript may be analyzed using one or more named-entity recognition (NER) techniques to identify the plurality of sets of entities.

In some examples, the plurality of sets of topics (e.g., labels) may comprise topics (expressed, discussed, etc.) in the first video. In some examples, the plurality of sets of topics may (each) be selected from a list of topics. In some examples, the list of topics may be based upon the subject matter of the first video. In an example, the first video may be a news-related video. Accordingly, the list of topics may comprise: The Economy, Politics, Business News, The United States, International News, The White House, Entertainment, Celebrity News, Science News, Technology, Health News, etc. In a second example, the first video may be a travel-related video. Accordingly, the list of topics may comprise: Travel destinations, Cuisine, Transportation, Cost-friendliness, Asia Tourism, South America Tourism, Africa Tourism, etc.

In some examples, the transcript may be analyzed to identify the plurality of sets of topics. Each set of topics of the plurality of sets of topics may correspond to a text segment of the plurality of text segments. In some examples, the plurality of sets of topics may be identified by comparing each text segment of the plurality of text segments to one or more information databases. For example, text segments of the plurality of text segments may be compared with one or more second resources (e.g., an encyclopedia, an online encyclopedia, a news channel, a news website, a website, a book, a research article, a research article database and/or a different type of information database, etc.) to identify the plurality of sets of topics. In some examples, the one or more first resources (used to identify the plurality of sets of entities) may be the same as the one or more second resources (used to identify the plurality of sets of topics). Alternatively and/or additionally, the one or more first resources may be different than the one or more second resources. Alternatively and/or additionally, the transcript may be analyzed using one or more multi-label learning (MLL) techniques. For example, text segments may be assigned sets of topics (selected from the list of topics) using the one or more MLL techniques.

In some examples, the plurality of sets of topics may be identified based upon the plurality of sets of entities. For example, the one or more MLL techniques may be used to identify and/or select a set of topics associated with each set of entities of the plurality of sets of entities. For example, a first set of entities of the plurality of sets of entities (and/or the first text segment associated with the first set of entities) may be analyzed using the one or more MLL techniques. A first set of topics may be selected from the list of topics using the one or more MLL techniques, based upon the first set of entities (and/or the first text segment).

Alternatively and/or additionally, the plurality of sets of entities may be identified based upon the plurality of sets of topics. For example, text segments of the plurality of text segments may be compared with the one or more first resources to identify the plurality of sets of entities, based upon the plurality of sets of topics. Alternatively and/or additionally, the transcript may be analyzed based upon the plurality of sets of topics, using the one or more NER techniques, to identify the plurality of sets of entities. For example, a second text segment may be analyzed (using the one or more NER techniques) based upon a second set of topics (associated with the second text segment) to identify a second set of entities.

Alternatively and/or additionally, the plurality of sets of topics may be analyzed to determine contexts (e.g., surrounding substance, general subject matter, general labels, etc.) of the plurality of text segments. The plurality of text segments may be compared with the one or more first resources to identify the plurality of sets of entities, based upon the contexts. Alternatively and/or additionally, the transcript may be analyzed, based upon the contexts, using the one or more NER techniques, to identify the plurality of sets of entities.

Alternatively and/or additionally, the plurality of sets of entities may be analyzed to determine contexts (e.g., surrounding substance, general subject matter, general labels, etc.) of the plurality of text segments. The plurality of text segments may be compared with the one or more second resources to identify the plurality of sets of topics, based upon the contexts. Alternatively and/or additionally, the transcript may be analyzed, based upon the contexts, using the one or more NER techniques, to identify the plurality of sets of topics.

In an example, the first text segment (e.g., "The President made a big decision today related to jobs") may be analyzed to identify the first set of entities associated with the first text segment and/or the first set of topics associated with the first text segment. For example, the first set of entities may comprise a first entity "James Presidentsworth" corresponding to a name of a current president, a second entity "Jun. 1, 2018" corresponding to a date associated with "today" and/or a third entity "job market" corresponding to "jobs". Alternatively and/or additionally, the first set of topics may comprise a first topic "Politics" and/or a second topic "The Economy" (e.g., the first set of topics may be selected from the list of topics). The first set of topics may be identified based upon the first set of entities and/or the first text segment.

Alternatively and/or additionally, the second text segment may comprise: "He announced that construction of numerous highways is being planned and more job opportunities will be available". The second text segment may be analyzed to identify the second set of entities and/or the second set of topics. For example, the second set of entities may comprise the first entity "James Presidentsworth" corresponding to the name of the current president (e.g., the first entity may be identified based upon the second text segment comprising "He", the first text segment and/or the first set of entities), a fourth entity "highway construction" and/or the third entity "job market" corresponding to "job opportunities". Alternatively and/or additionally, the second set of topics may comprise the first topic "Politics" and/or the second topic "The Economy" (e.g., the second set of topics may be selected from the list of topics). The second set of topics may be identified based upon the second set of entities and/or the second text segment.

Alternatively and/or additionally, a third text segment may comprise: "However, the announcement caused backlash by the Speaker of the House who said focus needs to be placed on combatting potential flu viruses". The third text segment may be analyzed to identify a third set of entities and/or a third set of topics. For example, the third set of entities may comprise a fifth entity "backlash", a sixth entity "Julia Speakerton" corresponding to a name of a current Speaker of the House and/or a seventh entity "flu virus". Alternatively and/or additionally, the third set of topics may comprise the first topic "Politics" and/or a third topic "Health". The third set of topics may be identified based upon the third set of entities and/or the third text segment.

In some examples, the plurality of sets of tags (e.g., the plurality of sets of entities and/or the plurality of sets of topics) may be identified based upon the video data (of the first video). For example, rather than (or in addition to) identifying the plurality of sets of tags based upon the transcript (and/or the audio data) the video data may be analyzed (e.g., using one or more image analysis techniques to determine people, characters, objects and/or locations associated with the first video) to identify the plurality of sets of tags. Alternatively and/or additionally, the plurality of sets of tags may be identified based upon a combination of the transcript and/or the video data.

In some examples, the plurality of sets of tags (e.g., the plurality of sets of entities and/or the plurality of sets of topics) may be identified based upon the determination of a sound track (e.g., of a movie, a television show, a song, a lecture, an audiobook, etc.) based upon the audio data (of the first video). For example, one or more portions of the audio data may be determined to match and/or be similar to a sound track in a sound track database (e.g., which may be determined based upon a comparison of markers of the audio data and markers of the sound track). The name of the sound track, a date of the sound track, entities associated with generating and/or publishing the sound track, and/or entities and/or topics associated with the sound track may then be determined and included in the plurality of sets of tags.

In some examples, the plurality of sets of tags (e.g., the plurality of sets of entities and/or the plurality of sets of topics) may be identified based upon the recognition of a voice (e.g., of a person, a character, etc.) based upon the audio data (of the first video). For example, one or more portions of the audio data may be determined to match and/or be similar to a defined voice in a voice database (e.g., which may be determined based upon a comparison of markers of the audio data and markers of the defined voice). The name associated with the voice, dates associated with the voice, and/or entities and/or topics associated with the voice may then be determined and included in the plurality of sets of tags.

At 408, a plurality of selectable inputs may be generated based upon the plurality of sets of tags. For example, each selectable input of the plurality of selectable inputs may correspond to an indication of a tag (e.g., an entity and/or a topic) of the plurality of sets of tags and a time associated with the tag. For example, each selectable input of the plurality of selectable inputs may comprise an indication of an entity of the plurality of sets of entities and/or an indication of a topic of the plurality of sets of topics.

In some examples, each selectable input of the plurality of selectable inputs may comprise an electronic button, a selectable graphical object and/or a selectable text object. For example, a selectable input of the plurality of selectable inputs may comprise a selectable graphical object comprising a selectable image representative of an entity and/or a topic (e.g., a selectable image representative of the current president, a selectable image representative of the economy, etc.). Alternatively and/or additionally, a selectable input of the plurality of selectable inputs may comprise a selectable text object comprising selectable text representative of an entity and/or a topic (e.g., "James Presidentsworth", "The Economy", etc.).

In some examples, each selectable input of the plurality of selectable inputs may be associated with a time (of the first video) associated with an entity of the plurality of sets of entities and/or a topic of the plurality of sets of topics. Accordingly, the plurality of selectable inputs may be associated with a plurality of times (of the first video). Each selectable input of the plurality of selectable inputs may be associated with a time of the plurality of times. In some examples, the plurality of times may be (determined) based upon time segments associated with the plurality of text segments.

For example, a selectable input of the plurality of selectable inputs may be associated with a time associated with a tag (e.g., an entity and/or a topic). The time (associated with the selectable input) may be determined based upon one or more time segments associated with one or more text segments associated with the tag. For example, the one or more text segments may be associated with one or more sets of tags comprising the tag. Alternatively and/or additionally, the time (associated with the selectable input) may be determined based upon a text segment (and/or a time segment associated with the text segment) associated with an initial instance of the tag (e.g., a text segment and/or a set of tags comprising the first instance of the tag amongst the plurality of text segments and/or the plurality of sets of tags). In some examples, the time may correspond to a beginning of the time segment.

In an example, a first selectable input may be generated based upon the first entity (e.g., "James Presidentsworth").

The first selectable input may comprise a first button, a first selectable graphical object (e.g., a first selectable image representative of the current president) and/or a first selectable text object (e.g., "James Presidentsworth", "The President", "President", etc.). Alternatively and/or additionally, the first selectable input may be associated with a third time. The third time may be determined based upon the first time segment associated with the first text segment and/or a second time segment associated with the second text segment (and/or a different time segment associated with a text segment that is associated with a set of entities comprising the first entity). Alternatively and/or additionally, the third time may be determined based upon a time segment corresponding to a text segment associated with an initial instance of the first entity (e.g., a text segment and/or a set of entities comprising the first instance of the first entity amongst the plurality of text segments and/or the plurality of sets of entities). Accordingly, responsive to determining that the first entity is initially expressed (e.g., expressed for the first time) in the first text segment (e.g., and/or during the first time segment) and/or is comprised within the first set of entities, the third time may be determined based upon the first time segment (associated with the first text segment and/or the first set of entities). In some examples, the third time may correspond to the beginning of the first time segment (e.g., 00:00:03, 3 seconds into the first video, etc.).

In some examples, the plurality of sets of entities may be analyzed to generate a first plurality of weights associated with the plurality of sets of entities. For example, each weight of the first plurality of weights may be assigned to an entity of the plurality of sets of entities. In some examples, each weight of the first plurality of weights may be generated and/or assigned to an entity based upon a frequency of the entity in the plurality of sets of entities (e.g., a number of instances of the entity in the plurality of sets of entities, a number of sets of entities that comprise the entity, etc.). Alternatively and/or additionally, each weight of the first plurality of weights may be generated and/or assigned to an entity based upon a relevance of the entity in the plurality of sets of entities (e.g., a closeness of subject matter of the entity to other entities of the plurality of sets of entities, a closeness of subject matter of the entity to one or more text segments of the plurality of text segments, a closeness of subject matter of the entity to one or more sets of topics of the plurality of topics, etc.).

In some examples, the plurality of selectable inputs may comprise a second plurality of selectable inputs associated with the plurality of sets of entities. For example, the second plurality of selectable inputs may comprise indications of entities of the plurality of sets of entities. Alternatively and/or additionally, the second plurality of selectable inputs may (merely) comprise indications of a second plurality of entities assigned a second plurality of weights above a first weight threshold. For example, the second plurality of selectable inputs may be generated responsive to a determination that each entity of the second plurality of entities (associated with the second plurality of selectable inputs) is assigned a weight above the first weight threshold.

Alternatively and/or additionally, the second plurality of selectable inputs may comprise indications of a third plurality of entities, wherein each entity of the third plurality of entities is associated with a frequency above a first frequency threshold. For example, the second plurality of selectable inputs may be generated responsive to a determination that each entity of the third plurality of entities (associated with the second plurality of selectable inputs) is associated with a frequency (e.g., a number of instances of the entity in the plurality of sets of entities, a number of sets of entities that comprise the entity, etc.) that is above the first frequency threshold (e.g., a threshold number of instances of an entity in the plurality of sets of entities, a threshold number of sets of entities that comprise an entity, etc.).

Alternatively and/or additionally, the plurality of sets of entities may be clustered (and/or grouped) into a plurality of groups of entities. For example, the plurality of sets of entities may be analyzed to determine the plurality of groups of entities, wherein each group of entities of the plurality of groups of entities may comprise instances of the same entity, similar entities, etc. Each group of entities of the plurality of groups of entities may be combined (and/or aggregated) to generate a fourth plurality of entities. For example, each group of entities of the plurality of groups of entities may be assigned an entity (e.g., an entity name) based upon the group of entities. Accordingly, each entity of the fourth plurality of entities may correspond to a group of entities and/or an entity (e.g., a unique entity wherein there are no other entities in the plurality of sets of entities matching and/or similar to the unique entity).

Thus, the second plurality of selectable inputs may comprise indications of the fourth plurality of entities. Alternatively and/or additionally, the second plurality of selectable inputs may comprise indications of (merely) a first portion of the fourth plurality of entities, wherein each entity of the first portion of the fourth plurality of entities is associated with a weight above the first weight threshold. Alternatively and/or additionally, the second plurality of selectable inputs may comprise indications of (merely) a second portion of the fourth plurality of entities, wherein each entity of the second portion of the fourth plurality of entities is associated with a frequency above the first frequency threshold (e.g., each entity of the second portion of the fourth plurality of entities may correspond to a group of entities comprising a number of entities above the first frequency threshold).

In an example, a first weight may be assigned to the first entity (e.g., "James Presidentsworth") based upon a first frequency of the first entity in the plurality of sets of entities (e.g., 46 instances of the first entity in the plurality of sets of entities) and/or a first relevance of the first entity (e.g., 80% relevance of the first entity to the plurality of sets of entities and/or the plurality of sets of topics). In some examples, the first weight may be compared with the first weight threshold to determine whether to generate the first selectable input (associated with the first entity). In some examples, the first weight may be above the first weight threshold. Accordingly, the first selectable input may be generated and/or the plurality of selectable inputs may comprise the first selectable input. Alternatively and/or additionally, the first weight may be below the first weight threshold. Accordingly, the first selectable input may not be generated and/or the plurality of selectable inputs may not comprise the first selectable input.

Alternatively and/or additionally, the first frequency (e.g., 46), of the first entity, may be compared with the first frequency threshold to determine whether to generate the first selectable input (associated with the first entity). In some examples, the first frequency may be above the first frequency threshold (e.g., the first frequency threshold may be 30 and/or a different number less than 46). Accordingly, the first selectable input may be generated and/or the plurality of selectable inputs may comprise the first selectable input. Alternatively and/or additionally, the first frequency may be below than the first frequency threshold (e.g., the first frequency threshold may be 50 and/or a different number above 46). Accordingly, the first selectable input may not be generated and/or the plurality of selectable inputs may not comprise the first selectable input. Alternatively and/or additionally, (both) the first weight and the first frequency may be compared with the first weight threshold and the first frequency threshold to determine whether to generate the first selectable input (associated with the first entity).

In some examples, the plurality of sets of topics may be analyzed to generate a third plurality of weights associated with the plurality of sets of topics. For example, each weight of the third plurality of weights may be assigned to a topic of the plurality of sets of topics. In some examples, each weight of the third plurality of weights may be generated and/or assigned to a topic based upon a frequency of the topic in the plurality of sets of topics (e.g., a number of instances of the topic in the plurality of sets of topics, a number of sets of topics that comprise the topic, etc.). Alternatively and/or additionally, each weight of the third plurality of weights may be generated and/or assigned to a topic based upon a relevance of the topic in the plurality of sets of topics (e.g., a closeness of subject matter of the topic to other topics of the plurality of sets of topics, a closeness of subject matter of the topic to one or more text segments of the plurality of text segments, a closeness of subject matter of the topic to one or more sets of entities, etc.).

In some examples, the plurality of selectable inputs may comprise a third plurality of selectable inputs associated with the plurality of sets of topics. For example, the third plurality of selectable inputs may comprise indications of topics of the plurality of sets of topics. Alternatively and/or additionally, the third plurality of selectable inputs may (merely) comprise indications of a second plurality of topics assigned a fourth plurality of weights above a second weight threshold. For example, the third plurality of selectable inputs may be generated responsive to a determination that each topic of the second plurality of topics (associated with the third plurality of selectable inputs) is assigned a weight above the second weight threshold.

Alternatively and/or additionally, the third plurality of selectable inputs may comprise indications of a third plurality of topics, wherein each topic of the third plurality of topics is associated with a frequency above a second frequency threshold. For example, the third plurality of selectable inputs may be generated responsive to a determination that each topic of the third plurality of topics (associated with the third plurality of selectable inputs) is associated with a frequency (e.g., a number of instances of the topic in the plurality of sets of topics, a number of sets of topics that comprise the topic, etc.) that is above the second frequency threshold (e.g., a threshold number of instances of a topic in the plurality of sets of topics, a threshold number of sets of topics that comprise a topic, etc.).

Alternatively and/or additionally, the plurality of sets of topics may be clustered (and/or grouped) into a plurality of groups of topics. For example, the plurality of sets of topics may be analyzed to determine the plurality of groups of topics, wherein each group of topics of the plurality of groups of topics may comprise instances of the same topic, similar topics, etc. Each group of topics of the plurality of groups of topics may be combined (and/or aggregated) to generate a fourth plurality of topics. For example, each group of topics of the plurality of groups of topics may be assigned a topic (e.g., a topic name) based upon the group of topics. Accordingly, each topic of the fourth plurality of topics may correspond to a group of topics and/or a (single) topic (e.g., a unique topic wherein there are no other topics in the plurality of sets of topics matching and/or similar to the unique topic).

Thus, the third plurality of selectable inputs may comprise indications of the fourth plurality of topics. Alternatively and/or additionally, the third plurality of selectable inputs may comprise indications of (merely) a first portion of the fourth plurality of topics, wherein each topic of the first portion of the fourth plurality of topics is associated with a weight above the second weight threshold. Alternatively and/or additionally, the third plurality of selectable inputs may comprise indications of (merely) a second portion of the fourth plurality of topics, wherein each topic of the second portion of the fourth plurality of topics is associated with a frequency above the second frequency threshold (e.g., each topic of the second portion of the fourth plurality of topics may correspond to a group of topics comprising a number of topics above the second frequency threshold).

In some examples, the second plurality of selectable inputs may be formatted based upon the first plurality of weights associated with the plurality of sets of entities (associated with the second plurality of selectable inputs). For example, a text font, a size, a text color, a background color, a background pattern, etc. of each selectable input of the second plurality of selectable inputs may be formatted based upon a weight (of the first plurality of weights) assigned to an entity associated with the selectable input. For example, the first selectable input (associated with the first entity assigned the first weight) may be formatted having a first format. Alternatively and/or additionally, the second entity may be assigned a second weight. The second weight may be different than the first weight. Accordingly, a second selectable input, associated with the second entity, may be generated and/or formatted having a second format, different than the first format. For example, the first weight may be greater than the second weight. Accordingly, the first selectable input may have a larger size and/or a darker shade of color than (a size and/or a text color of) the second selectable input, for example.

Alternatively and/or additionally, the third plurality of selectable inputs may be formatted based upon the third plurality of weights associated with the plurality of sets of topics (associated with the third plurality of selectable inputs). For example, a text font, a size, a text color, a background color, a background pattern, etc. of each selectable input of the third plurality of selectable inputs may be formatted based upon a weight (of the third plurality of weights) assigned to topic associated with the selectable input. For example, the first topic may be assigned a third weight and/or the second topic may be assigned a fourth weight. The third weight may be different than the fourth weight. Accordingly, a third selectable input, associated with the first topic, may be generated and/or formatted having a third format. A fourth selectable input, associated with the second topic, may be generated and/or formatted having a fourth format, different than the third format. For example, the third weight may be greater than the fourth weight. Accordingly, the third selectable input may have a larger size and/or a darker shade of color than (a size and/or a text color of) the fourth selectable input, for example.

In some examples, the second plurality of selectable inputs (associated with the plurality of sets of entities) may be formatted based upon an entity format. For example, a text font, a size, a text color, a background color, a background pattern, etc. of each selectable input of the second plurality of selectable inputs may be generated and/or formatted based upon the entity format. Alternatively and/or additionally, the third plurality of selectable inputs (associated with the plurality of sets of topics) may be formatted based upon a topic format. For example, a text font, a size, a text color, a background color, a background pattern, etc. of each selectable input of the third plurality of selectable inputs may be generated and/or formatted based upon the topic format. In some examples, the entity format may be different than the topic format. For example, the second plurality of selectable inputs may (each) have a first text color (e.g., black, blue, green, red, yellow, etc.) corresponding to the entity format and the third plurality of selectable inputs may (each) have a second text color (e.g., black, blue, green, red, yellow, etc.) corresponding to the topic format. The first text color (e.g., blue) may be different than the second text color (e.g., red), for example. Alternatively and/or additionally, the first text color may be the same as the second text color.

At 410, the graphical user interface of the device (of the user) may be controlled to display the video interface comprising the plurality of selectable inputs. For example, a list of selectable inputs may be generated, comprising the plurality of selectable inputs. In some examples, a first portion of the list of selectable inputs may comprise the second plurality of selectable inputs (associated with the plurality of sets of entities) and/or a second portion of the list of selectable inputs may comprise the third plurality of selectable inputs (associated with the plurality of sets of topics). In some examples, the first portion of the list of selectable inputs may be separate from the second portion of the list of selectable inputs. Alternatively and/or additionally, the first portion of the list of selectable inputs may not be separate from the second portion of the list of selectable inputs.

In some examples, the list of selectable inputs may be organized, sorted and/or displayed in an order based upon weights associated with the plurality of selectable inputs. For example, selectable inputs associated with (relatively) greater weights may be displayed before (e.g., above, in front of, etc.) selectable inputs associated with (relatively) lesser weights. In an example, a fifth selectable input may comprise an indication of a fifth tag (e.g., an entity and/or a topic) having a fifth weight. A sixth selectable input may comprise an indication of a sixth tag (e.g., an entity and/or a topic) having a sixth weight. The fifth weight may be greater than the sixth weight. Accordingly, the list of selectable inputs may comprise the fifth selectable input before (e.g., above, in front of, etc.) the sixth selectable input.

Alternatively and/or additionally, the list of selectable inputs may be organized, sorted and/or displayed in an order based upon times associated with the plurality of selectable inputs. For example, the selectable inputs associated with earlier times (of the duration of time of the first video) may be displayed before (e.g., above, in front of, etc.) selectable inputs associated with later times (of the duration of time of the first video). In an example, a seventh selectable input may be associated with a seventh time (e.g., the seventh selectable input may comprise an indication of a seventh tag associated with a time segment corresponding to the seventh time). An eighth selectable input may be associated with an eighth time (e.g., the eighth selectable input may comprise an indication of an eighth tag associated with a time segment corresponding to the eighth time). The seventh time may be earlier than the eighth time (e.g., the seventh time may be earlier than the eighth time with respect to the duration of time of the first video). Accordingly, the list of selectable inputs may comprise the seventh selectable input before (e.g., above, in front of, etc.) the eighth selectable input.

For example, the list of selectable inputs may be displayed having one column comprising the plurality of selectable inputs. Alternatively and/or additionally, the list of selectable inputs may be displayed having a first set of columns comprising the first portion of the list of selectable inputs (corresponding to the second plurality of selectable inputs associated with the plurality of sets of entities) and a second set of columns comprising the second portion of the list of selectable inputs (corresponding to the third plurality of selectable inputs associated with the plurality of sets of topics).

Alternatively and/or additionally, the list of selectable inputs may be displayed having a shape. For example, the list of selectable inputs may be displayed within a square-shaped outline. The square-shaped outline may be displayed, surrounding the list of selectable inputs (e.g., a square-shaped border surrounding the list of selectable inputs may be displayed). Alternatively and/or additionally, the square-shaped outline may not be displayed (e.g., there may not be a border surrounding the list of selectable inputs). For example, the list of selectable inputs may resemble a square-like shape.

Alternatively and/or additionally, the list of selectable inputs may be displayed within a rectangular outline. For example, the list of selectable inputs may be displayed within a rectangular outline. The rectangular outline may be displayed, surrounding the list of selectable inputs (e.g., a rectangular border surrounding the list of selectable inputs may be displayed). Alternatively and/or additionally, the rectangular outline may not be displayed (e.g., there may not be a border surrounding the list of selectable inputs). For example, the list of selectable inputs may resemble a rectangular shape.

Alternatively and/or additionally, the list of selectable inputs may be displayed within a circular outline. The circular outline may be displayed, surrounding the list of selectable inputs (e.g., a circular border surrounding the list of selectable inputs may be displayed). Alternatively and/or additionally, the circular outline may not be displayed (e.g., there may not be a border surrounding the list of selectable inputs). For example, the list of selectable inputs may resemble a circular shape.

Alternatively and/or additionally, the list of selectable inputs may be displayed within an elliptical outline (e.g., a cloud-shaped outline, a bubble-shaped outline, etc.). The elliptical outline may be displayed, surrounding the list of selectable inputs (e.g., an elliptical border, a cloud-like border and/or a bubble-like border surrounding the list of selectable inputs may be displayed). Alternatively and/or additionally, the elliptical outline may not be displayed (e.g., there may not be a border surrounding the list of selectable inputs). For example, the list of selectable inputs may resemble an elliptical shape (e.g., a cloud-like shape, a bubble-like shape, etc.).

In some examples, the graphical user interface of the device may be controlled to display the list of selectable inputs (comprising the plurality of selectable inputs) responsive to (receiving) a selection of the first video. For example, the list of videos of the video interface may comprise a fourth plurality of selectable inputs corresponding to a second plurality of videos. In some examples, a ninth selectable input of the fourth plurality of selectable inputs (of the list of videos) may be associated with the first video.

For example, responsive to (receiving) a selection of the ninth selectable input, the list of selectable inputs (associated with the plurality of sets of tags of the first video) may be displayed. Alternatively and/or additionally, the first video may be displayed adjacent to the list of selectable inputs (e.g., the first video may be displayed above, below, next to, etc. the list of selectable inputs).

At 412, a selection of a tenth selectable input of the plurality of selectable inputs may be received via the video interface (and/or the list of selectable inputs). In some examples, the tenth selectable input may be associated with a tenth tag (e.g., an entity and/or a topic) of the plurality of sets of tags and/or a tenth time of the first video. For example, the tenth selectable input may comprise an indication of the tenth tag and/or the tenth tag may be associated with a time segment associated with the tenth time.

At 414, responsive to receiving the selection of the tenth selectable input, a second graphical user interface of a second device may be controlled to display the first video. The first video may be displayed based upon the tenth time of the first video. For example, the first video may be displayed beginning with (e.g., starting at) the tenth time of the duration of time of the first video. Alternatively and/or additionally, the first video may be displayed beginning with (e.g., starting at) a third duration of time (e.g., a few seconds, 10 seconds, 1 minute, etc.) before the tenth time (of the duration of time) of the first video (such that a context of the tenth time may be conveyed to the user and/or one or more viewers of the first video).

In some examples, the second device may be the same as the first device and/or the second graphical user interface may be the same as the first graphical user interface. In an example, the first device (and/or the second device) may comprise a television (e.g., a smart television), a phone (e.g., a smart phone), a tablet, a computer (e.g., a desktop computer, a laptop, a computer connected to a television and/or a monitor, etc.), etc.

Alternatively and/or additionally, the second device may be different than the first device and/or the second graphical user interface may be different than the first graphical user interface. For example, one or more videos may be selected from the list of videos (via the video interface) using the first device (e.g., a smart phone, a computer, a tablet, etc.) and/or the one or more videos may be displayed using the second device (e.g., a television, a computer connected to a television and/or a monitor, etc.). For example, the second device may be connected to the first device via a network connection (e.g., WiFi, Bluetooth, etc.).

FIGS. 5A-5E illustrate examples of a system 501 for displaying videos based upon selectable inputs associated with tags. A first user, such as user James (and/or a first device 500 associated with the first user) may access and/or interact with a service, such as a website, an application, etc. that provides a platform for viewing and/or downloading videos from one or more servers (of the website, the application, etc.). For example, a first graphical user interface of the first device may be controlled to display a video interface. In some examples, the video interface may enable the first user and/or the first device to upload content (e.g., videos, images, etc.) to the one or more servers.

Figure 5A:
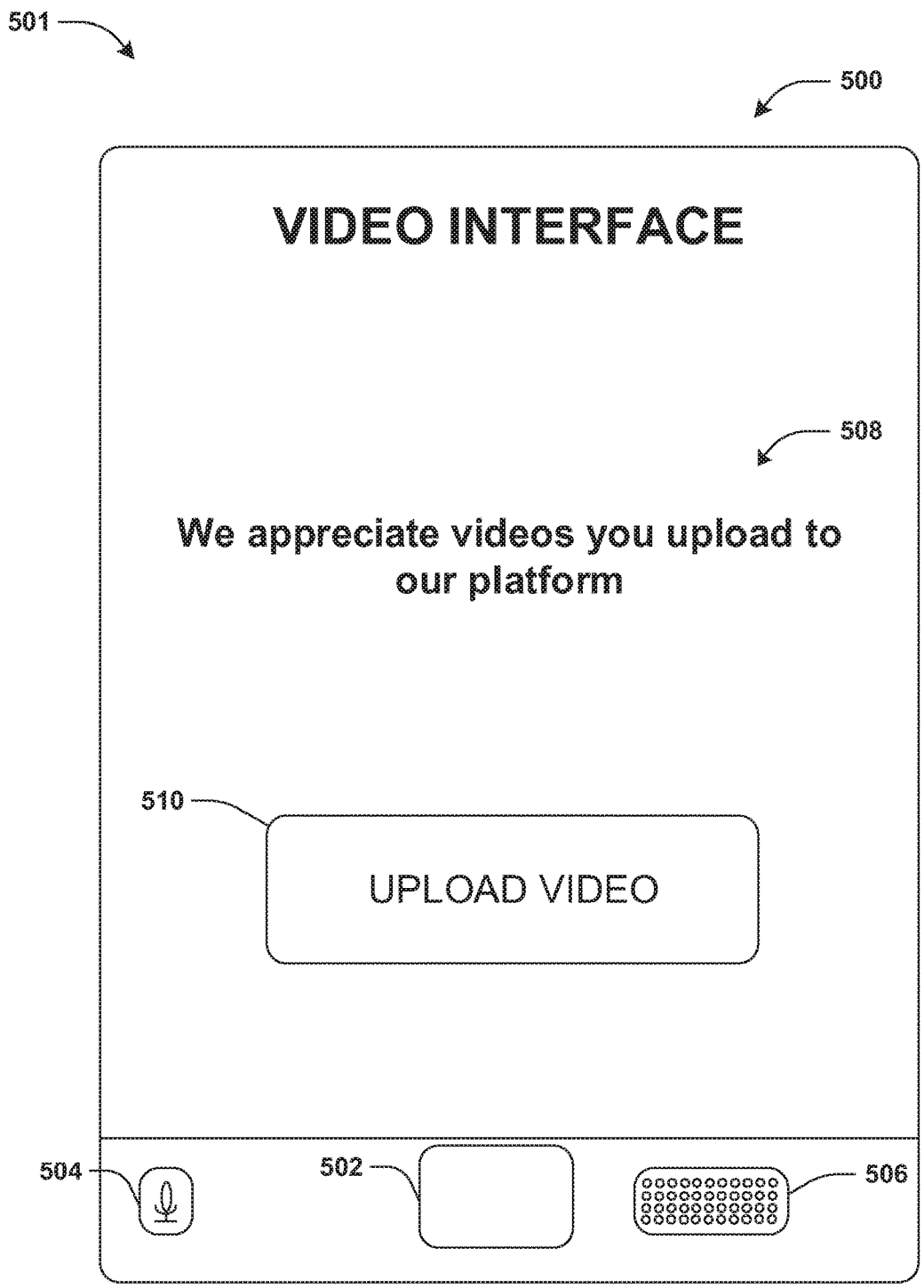
FIG. 5A is a component block diagram illustrating an example system for displaying videos based upon selectable inputs associated with tags, where a first graphical user interface of a first device is controlled to display a video interface.

FIG. 5A illustrates the first graphical user interface of the first device 500 being controlled to display the video interface. The first device 500 may comprise a button 502, a microphone 504 and/or a speaker 506. For example, the video interface may display instructions 508 and/or a first selectable input 510 corresponding to uploading one or more videos to the one or more servers and/or to a video database associated with the service. In some examples, responsive to a selection of the first selectable input 510, a first video may be selected and/or uploaded to the one or more servers.

FIG. 5B illustrates a backend system 525 (e.g., on the one or more servers of the service and/or on the first device 525 of the first user) that may generate a plurality of selectable inputs 542 (associated with the first video) responsive to the first video being uploaded to the one or more servers and/or to the video database. In some examples, the first video and/or a set of information 516 associated with the first video may be identified. The set of information 516 may comprise a title of the video "OUR INTERNATIONAL TRIP" and/or a duration of time of the first video "00:10:38" (e.g., the duration of time of the first video may be 10 minutes and 38 seconds).

The first video may comprise video data and/or audio data. A transcript 518 may be determined associated with the audio data of the first video. In some examples, the transcript 518 may be retrieved from the set of information 516 and/or the transcript 518 may be retrieved from the first video (e.g., the first video may comprise the transcript 518). Alternatively and/or additionally, the audio data may be transcribed to generate the transcript 518.

In some examples, the transcript 518 may comprise a plurality of text segments. In some examples, the transcript 518 may comprise a set of captions and/or a set of subtitles associated with the first video. For example, each text segment of the plurality of text segments may comprise a caption of the set of captions and/or a subtitle of the set of subtitles. Each text segment of the plurality of text segments may be associated with a time segment of the duration of time of the first video. For example, a first text segment "We began our journey in Africa" may be associated with a first time segment "00:00:04→00:00:12" indicating that the first text segment corresponds to words and/or sounds of the audio data from a first time of the first video (e.g., 00:00:004, 4 seconds into the first video, etc.) to a second time of the first video (e.g., 00:00:12, 12 seconds into the first video, etc.).

The transcript 518 may be analyzed to identify a plurality of sets of tags. For example, the plurality of sets of tags may comprise indications of a plurality of sets of entities 520 and/or a plurality of sets of topics 522. For example, the plurality of sets of entities 520 (e.g., named entities) may comprise subjects (expressed, discussed, etc.) in the first video. In some examples, the transcript 518 may be analyzed (using one or more NER techniques and/or other techniques) to identify the plurality of sets of entities 520. Each set of entities of the plurality of sets of entities 520 may correspond to a text segment of the plurality of text segments (of the transcript 518). For example, the first text segment (e.g., "We began our journey in Africa") may be analyzed to identify a first set of entities (of the plurality of sets of entities 520) associated with the first text segment. For example, the first set of entities may comprise a first entity "Journey" and/or a second entity "Africa".

Alternatively and/or additionally, the plurality of sets of topics 522 (e.g., labels) may comprise topics (expressed, discussed, etc.) in the first video. In some examples, the transcript 518 may be analyzed (using one or more MLL techniques and/or other techniques) to identify the plurality of sets of topics 522. In some examples, the plurality of sets of topics may (each) be selected from a list of topics. For example, the list of topics may be based upon the subject matter of the first video. For example, it may be determined that the first video is associated with travel (based upon the set of information 516, based upon the transcript 518, based upon user-defined information, etc.). Accordingly, the list of topics may comprise: Travel destinations, Cuisine, Transportation, Cost-friendliness, Asia Tourism, South America Tourism, Africa Tourism, etc.

Each set of topics of the plurality of sets of topics 522 may correspond to a text segment of the plurality of text segments (of the transcript 518). For example, the first text segment (e.g., "We began our journey in Africa") may be analyzed to identify a first set of topics (of the plurality of sets of topics 522) associated with the first text segment. For example, the first set of topics may comprise a first topic "Africa Tourism."

In some examples, the plurality of sets of entities 520 and/or the transcript 518 may be analyzed to generate a first plurality of weights associated with the plurality of sets of entities 520. For example, the first plurality of weights may be generated based upon a frequency, a relevance, etc. of entities of the plurality of sets of entities 520. Alternatively and/or additionally, the plurality of sets of topics 522 and/or the transcript 518 may be analyzed to generate a second plurality of weights associated with the plurality of sets of topics 522. For example, the second plurality of weights may be generated based upon a frequency, a relevance, etc. of topics of the plurality of sets of topics 522.

The plurality of selectable inputs 542 may be generated based upon the plurality of sets of entities 520, the first plurality of weights, the plurality of sets of topics 522 and/or the second plurality of weights. In some examples, the plurality of selectable inputs 542 may comprise a second plurality of selectable inputs associated with the plurality of sets of entities 520. For example, the second plurality of selectable inputs may comprise indications of entities of the plurality of sets of entities 520. Alternatively and/or additionally, the plurality of selectable inputs 542 may comprise a third plurality of selectable inputs associated with the plurality of sets of topics 522. For example, the third plurality of selectable inputs may comprise indications of topics of the plurality of sets of topics 522.

Figure 5C:
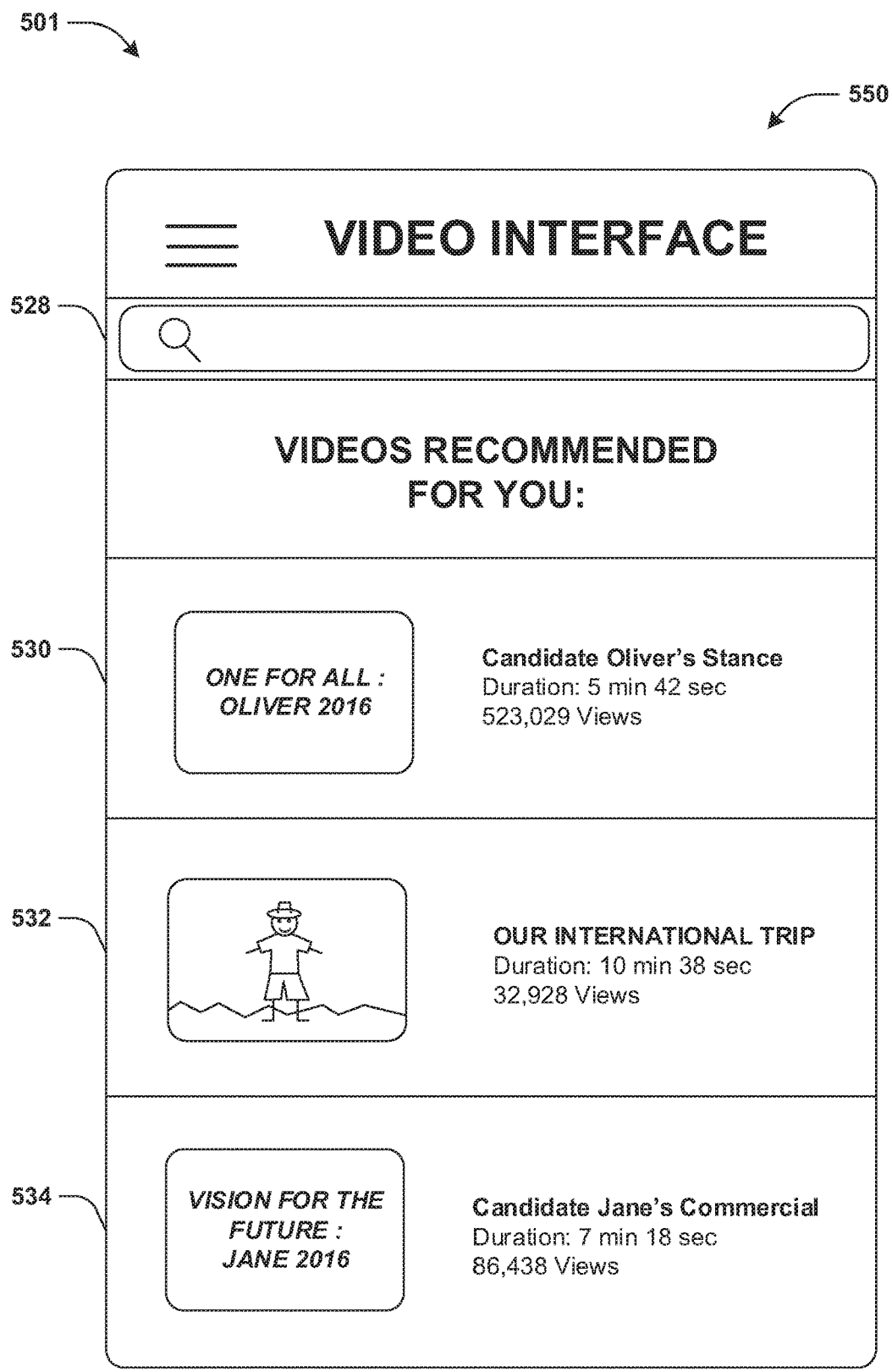
FIG. 5C is a component block diagram illustrating an example system for displaying videos based upon selectable inputs associated with tags, where a second graphical user interface of a second device is controlled to display a video interface comprising a list of video items.

FIG. 5C illustrates a second graphical user interface of a second device 550 (associated with a second user, such as user Janet) being controlled to display the video interface comprising a list of videos. In some examples, the video interface may display an input search area 528 for searching for videos (of the video database). For example, the list of videos may comprise a second selectable input 530 associated with a second video of the video database, a third selectable input 532 associated with the first video and/or a fourth selectable input 534 associated with a third video of the video database. For example, a selection of the third selectable input 532 may be received (from the second device 550). In some examples, responsive to the selection of the third selectable input 532, the video interface may display the first video and/or the plurality of selectable inputs 542.

Figure 5D:
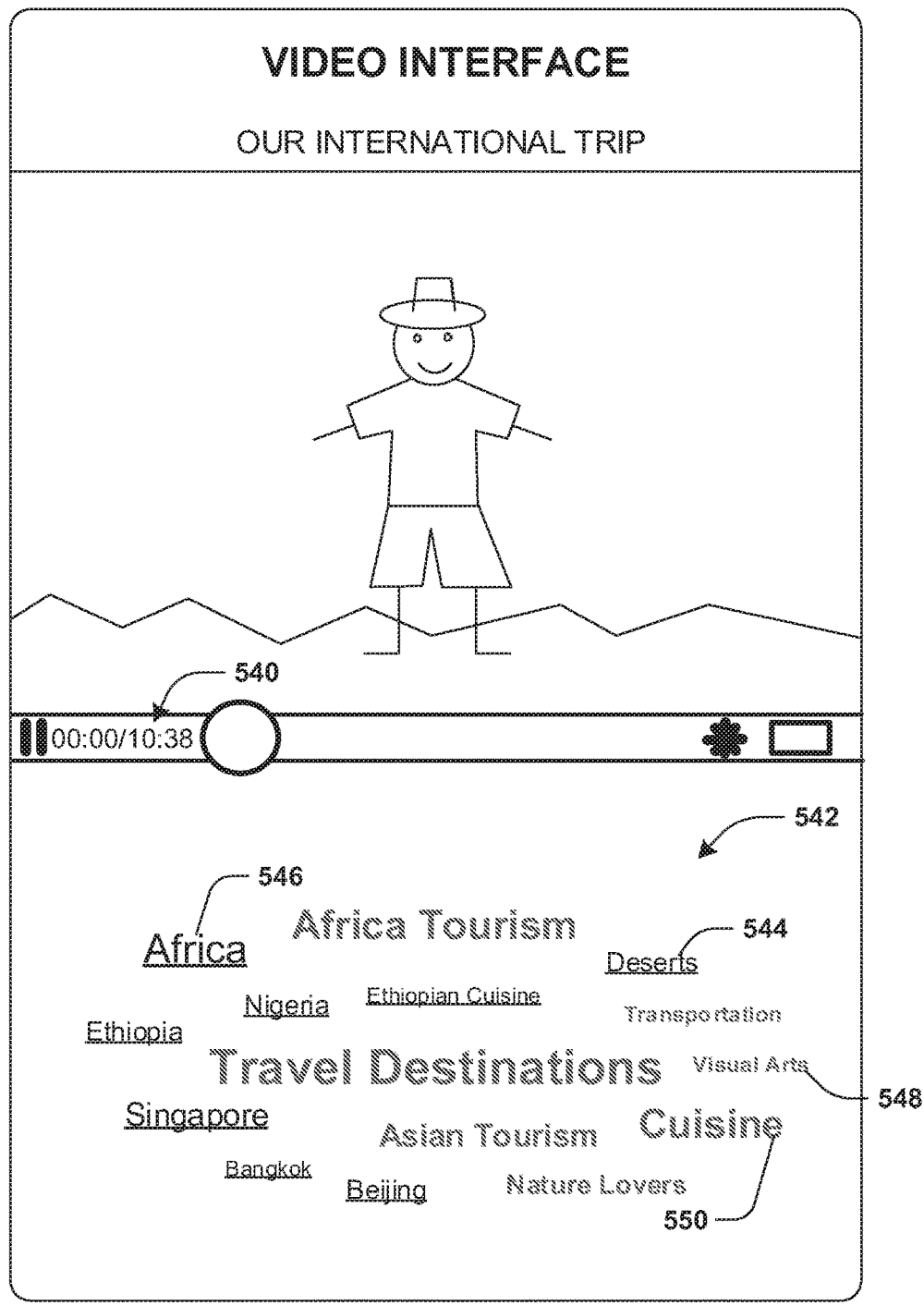
FIG. 5D is a component block diagram illustrating an example system for displaying videos based upon selectable inputs associated with tags, where a second graphical user interface of a second device is controlled to display a first video and/or a plurality of selectable inputs.

FIG. 5D illustrates the second graphical user interface of the second device 550 being controlled to display the first video and/or the plurality of selectable inputs 542. In some examples, the video interface may display a time indication 540 adjacent to (e.g., below) the first video. For example, the time indication 540 may indicate a time of (the duration of time of) the first video that is being presented.

In some examples, the second plurality of selectable inputs (associated with the plurality of sets of entities 520) may be formatted based upon the first plurality of weights associated with the plurality of sets of entities 520. For example, a text font, a size, a text color, a background color, a background pattern, etc. of each selectable input of the second plurality of selectable inputs may be formatted based upon a weight assigned to an entity associated with the selectable input. For example, the second plurality of selectable inputs may comprise a fifth selectable input 544 associated with a third entity "Deserts" assigned a first weight. Alternatively and/or additionally, the second plurality of selectable inputs may comprise a sixth selectable input 546 associated with the second entity (e.g., "Africa") assigned a second weight. In some examples, the second weight may be greater than the first weight. Accordingly, the sixth selectable input 546 may have a larger size than (a size of) the fifth selectable input 544, for example.

Alternatively and/or additionally, the third plurality of selectable inputs (associated with the plurality of sets of topics 522) may be formatted based upon the second plurality of weights associated with the plurality of sets of topics 522. For example, a text font, a size, a text color, a background color, a background pattern, etc. of each selectable input of the third plurality of selectable inputs may be formatted based upon a weight assigned to a topic associated with the selectable input. For example, the third plurality of selectable inputs may comprise a seventh selectable input 548 associated with a second topic "Visual Arts" assigned a third weight. Alternatively and/or additionally, the third plurality of selectable inputs may comprise an eighth selectable input 550 associated with a third topic "Cuisine" assigned a fourth weight. In some examples, the fourth weight may be greater than the third weight. Accordingly, the eighth selectable input 550 may have a larger size than a size of the seventh selectable input 548, for example.

Alternatively and/or additionally, the second plurality of selectable inputs (associated with the plurality of sets of entities 520) may be formatted based upon an entity format. Alternatively and/or additionally, the third plurality of selectable inputs (associated with the plurality of sets of topics 522) may be formatted based upon a topic format. In some examples, the entity format may be different than the topic format. For example, the second plurality of selectable inputs may (each) have a first font, a first text color and/or a first shade corresponding to the entity format and the third plurality of selectable inputs may (each) have a second font, a second text color and/or a second shade corresponding to the topic format. The first font (e.g., underlined) may be different than the second font (e.g., bold). Alternatively and/or additionally, the first text color (and/or the first shade) may be different than the second text color (and/or the second shade).

In some examples, a selection of the fifth selectable input 544 may be received. In some examples, the fifth selectable input 544 may be associated with a third time of (the duration of time of) the first video. For example, the third entity (e.g., "Deserts) (associated with the fifth selectable input 544) may be associated with a second time segment "00:03:42→00:03:54". For example, the third entity may be associated with a second text segment associated with the second time segment. Accordingly, the third time of the first video may be a beginning of the second time segment (e.g., "00:03:42", 3 minutes and 42 seconds into the first video, etc.). Alternatively and/or additionally, the third time of the first video may be a second duration of time prior to the beginning of the second time segment.

Figure 5E:
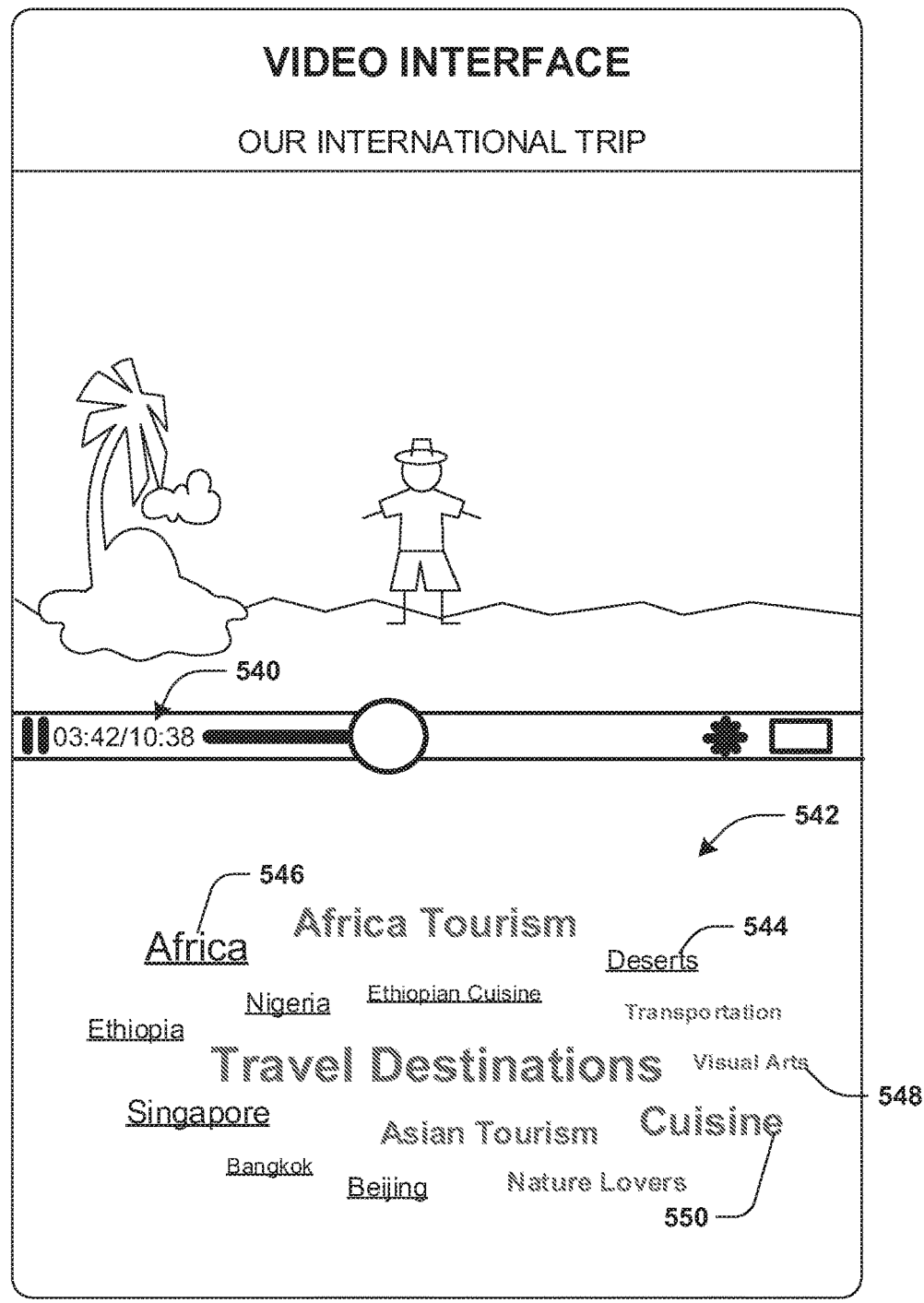
FIG. 5E is a component block diagram illustrating an example system for displaying videos based upon selectable inputs associated with tags, where a second graphical user interface of a second device is controlled to display a first video based upon a third time of the first video.

FIG. 5E illustrates the second graphical user interface of the second device 550 being controlled to display the first video based upon the third time of the first video. For example, the second graphical user interface of the second device 550 may be controlled to display the first video based upon the third time responsive to (receiving) the selection of the fifth selectable input 544. The first video may be displayed beginning with (e.g., starting at) the third time.

It may be appreciated that the disclosed subject matter may assist a user (and/or a device associated with the user) in displaying videos based upon selectable inputs associated with tags. Alternatively and/or additionally, the disclosed subject matter may assist the user (and/or the device) in displaying one or more segments of a video associated with subject matter (e.g., topics and/or entities) that may be of interest to the user.

Implementation of at least some of the disclosed subject matter may lead to benefits including, but not limited to, a reduction in screen space and/or an improved usability of a display (e.g., of the device) (e.g., as a result of enabling the device to display a plurality of selectable inputs corresponding to a plurality of tags, as a result of enabling the device and/or the user to select a selectable input associated with subject matter of interest to the user, as a result of presenting the video based upon a time associated with the selectable input, wherein the user and/or the device may not need to navigate through parts of the video in order to find the time associated with the subject matter, wherein a separate application and/or a separate window may not need to be opened in order to search for the time associated with the subject matter, etc.).

Alternatively and/or additionally, implementation of at least some of the disclosed subject matter may lead to benefits including increasing an accuracy and/or precision in transmitting requested and/or desired content to the device and/or presenting the requested and/or desired content to the user (e.g., as a result of enabling the device and/or the user to select the selectable input associated with the subject matter of interest to the user, as a result of presenting the video based upon the time associated with the selectable input and/or the subject matter, etc.).

Alternatively and/or additionally, implementation of at least some of the disclosed subject matter may lead to benefits including a reduction in bandwidth (e.g., as a result of reducing a need for navigating through parts of the video and/or downloading the parts of the video in an effort to find the time associated with the subject matter, etc.).

In some examples, at least some of the disclosed subject matter may be implemented on a device (e.g., a client device), and in some examples, at least some of the disclosed subject matter may be implemented on a server (e.g., hosting a service accessible via a network, such as the Internet).

Figure 6:
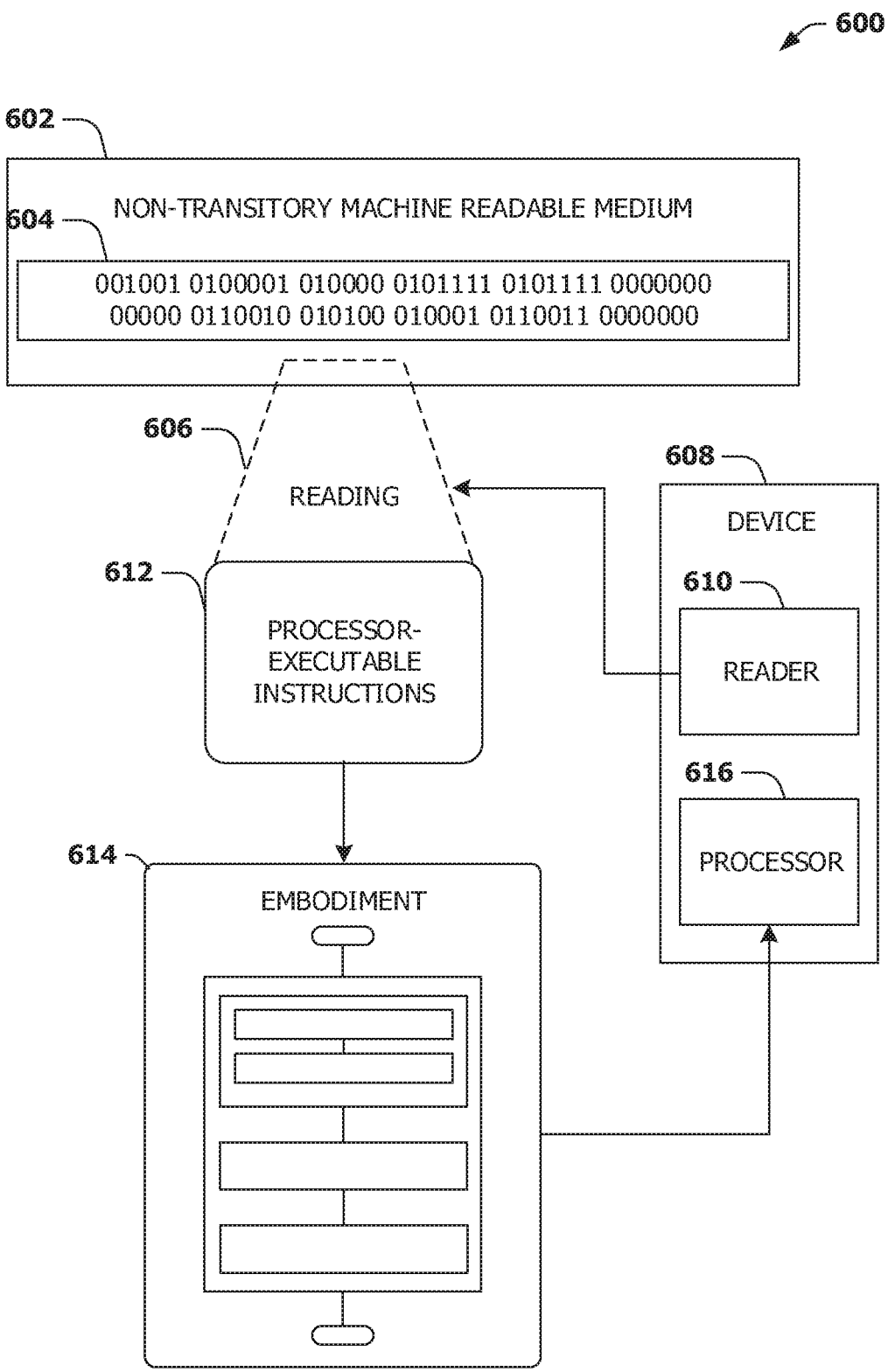
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying a video, wherein the video comprises video data and audio data;
   determining a transcript associated with the audio data, wherein the transcript comprises a plurality of text segments, wherein each text segment of the plurality of text segments is associated with a time segment of a duration of time of the video;
   analyzing the transcript to generate a plurality of sets of tags associated with the transcript, wherein each set of tags of the plurality of sets of tags corresponds to a text segment of the plurality of text segments;
   generating a plurality of selectable inputs based upon the plurality of sets of tags, wherein each selectable input of the plurality of selectable inputs comprises text representative of a tag of the plurality of sets of tags and a time associated with the tag, wherein a first selectable input of the plurality of selectable inputs comprises first text, comprising a first word, representative of a first tag associated with a first time of the video and a second selectable input of the plurality of selectable inputs comprises second text, comprising a second word, representative of a second tag associated with a second time of the video;
   displaying a video interface comprising the plurality of selectable inputs;
   receiving a selection of the first selectable input of the plurality of selectable inputs via the video interface; and
   responsive to receiving the selection of the first selectable input associated with the first tag, modifying the video interface to display the video based upon the first time associated with the first selectable input.

2. The method of claim 1, wherein:
   the second tag is different than the first tag;
   the analyzing the transcript comprises identifying a plurality of sets of entities, wherein each set of entities of the plurality of sets of entities corresponds to a text segment of the plurality of text segments; and
   the plurality of sets of tags comprises indications of the plurality of sets of entities,
   the method comprising:
      analyzing the plurality of sets of entities to generate a first plurality of weights associated with the plurality of sets of entities, wherein each weight of the first plurality of weights is assigned to an entity of the plurality of sets of entities based upon a frequency of the entity in the plurality of sets of entities.

3. The method of claim 1, wherein:
   the second tag is different than the first tag;
   the analyzing the transcript comprises identifying a plurality of sets of topics, wherein each set of topics of the plurality of sets of topics corresponds to a text segment of the plurality of text segments; and
   the plurality of sets of tags comprises indications of the plurality of sets of topics,
   the method comprising:
      analyzing the plurality of sets of topics to generate a first plurality of weights associated with the plurality of sets of topics, wherein each weight of the first plurality of weights is assigned to a topic of the plurality of sets of topics based upon a frequency of the topic in the plurality of sets of topics.

4. The method of claim 1, wherein the displaying the video interface comprising the plurality of selectable inputs comprises:
   displaying the first selectable input in a first position in the video interface based upon the first tag; and
   displaying the second selectable input in a second position in the video interface based upon the second tag.

5. The method of claim 1, wherein the displaying the video interface comprising the plurality of selectable inputs comprises:
   displaying the first selectable input in a first position in the video interface based upon a first weight associated with the first selectable input; and
   displaying the second selectable input in a second position in the video interface based upon a second weight associated with the second selectable input.

6. The method of claim 1, wherein:
   the analyzing the transcript comprises identifying a plurality of sets of topics, wherein each set of topics of the plurality of sets of topics corresponds to a text segment of the plurality of text segments; and
   the plurality of sets of tags comprises indications of the plurality of sets of topics.

7. The method of claim 6, comprising:
   analyzing the plurality of sets of topics to generate a second plurality of weights associated with the plurality of sets of topics, wherein each weight of the second plurality of weights is assigned to a topic of the plurality of sets of topics based upon a frequency of the topic in the plurality of sets of topics.

8. The method of claim 7, wherein:
   the plurality of selectable inputs comprises a third plurality of selectable inputs associated with the plurality of sets of topics; and
   the generating the plurality of selectable inputs comprises formatting each selectable input of the third plurality of selectable inputs based upon a weight assigned to a topic of the plurality of sets of topics associated with the selectable input.

9. The method of claim 1, wherein:
   the analyzing the transcript comprises:
      identifying a plurality of sets of entities, wherein each set of entities of the plurality of sets of entities corresponds to a text segment of the plurality of text segments; and
      identifying a plurality of sets of topics, wherein each set of topics of the plurality of sets of topics corresponds to a text segment of the plurality of text segments;
   the plurality of sets of tags comprises indications of the plurality of sets of entities and indications of the plurality of sets of topics;

the plurality of selectable inputs comprises a second plurality of selectable inputs associated with the plurality of sets of entities and a third plurality of selectable inputs associated with the plurality of sets of topics;

the generating the plurality of selectable inputs comprises formatting each selectable input of the second plurality of selectable inputs based upon a first format;

the generating the plurality of selectable inputs comprises formatting each selectable input of the third plurality of selectable inputs based upon a second format; and the first format is different than the second format.

10. The method of claim 9, wherein the identifying the plurality of sets of entities is performed based upon the plurality of sets of topics.

11. The method of claim 9, wherein the identifying the plurality of sets of topics is performed based upon the plurality of sets of entities.

12. The method of claim 1, wherein the first selectable input has a different format than the second selectable input.

13. The method of claim 1, wherein the first text represents at least one of a first entity or a first topic and the second text represents at least one of a second entity or a second topic.

14. A computing device comprising:
a processor; and
memory comprising processor-executable instructions that when executed by the processor cause performance of operations, the operations comprising:
generating a plurality of selectable inputs based upon a plurality of sets of tags associated with a video, wherein each selectable input of the plurality of selectable inputs corresponds to an indication of a tag of the plurality of sets of tags and a time associated with the tag;
displaying a video interface comprising the plurality of selectable inputs;
receiving a selection of a first selectable input of the plurality of selectable inputs via the video interface, wherein the first selectable input is associated with a first tag of the plurality of sets of tags and a first time of the video; and
responsive to receiving the selection of the first selectable input associated with the first tag, modifying the video interface to display the video based upon the first time associated with the first selectable input, wherein at least one of:
the first selectable input of the plurality of selectable inputs comprises first text representative of the first tag and a second selectable input of the plurality of selectable inputs comprises second text representative of a second tag;
the displaying comprises displaying the first selectable input with a different format than the second selectable input;
the displaying the video interface comprising the plurality of selectable inputs comprises:
displaying the first selectable input in a first position in the video interface based upon the first tag; and
displaying the second selectable input in a second position in the video interface based upon the second tag; or
the displaying the video interface comprising the plurality of selectable inputs comprises:

displaying the first selectable input in the first position in the video interface based upon a first weight associated with the first selectable input; and displaying the second selectable input in the second position in the video interface based upon a second weight associated with the second selectable input.

15. The computing device of claim 14, wherein the first tag is different than the second tag of the plurality of sets of tags.

16. The computing device of claim 15, wherein the first time is different than a second time associated with the second tag.

17. A non-transitory machine readable medium having stored thereon processor-executable instructions that when executed cause performance of operations, the operations comprising:
identifying a video, wherein the video comprises video data and audio data;
determining a transcript associated with the audio data, wherein the transcript comprises a plurality of text segments, wherein each text segment of the plurality of text segments is associated with a time segment of a duration of time of the video;
analyzing the transcript to generate a plurality of sets of tags associated with the transcript, wherein each set of tags of the plurality of sets of tags corresponds to a text segment of the plurality of text segments; and
generating a plurality of selectable inputs based upon the plurality of sets of tags, wherein each selectable input of the plurality of selectable inputs corresponds to an indication of a tag of the plurality of sets of tags and a time associated with the tag, wherein a first selectable input of the plurality of selectable inputs corresponds to an indication of a first tag associated with a first time of the video and a second selectable input of the plurality of selectable inputs corresponds to an indication of a second tag associated with a second time of the video, wherein at least one of:
the first selectable input comprises first text representative of the first tag and the second selectable input comprises second text representative of the second tag; or
the first selectable input has a different format than the second selectable input.

18. The non-transitory machine readable medium of claim 17, wherein:
the analyzing the transcript comprises:
identifying a plurality of sets of entities, wherein each set of entities of the plurality of sets of entities corresponds to a text segment of the plurality of text segments; and
identifying a plurality of sets of topics, wherein each set of topics of the plurality of sets of topics corresponds to a text segment of the plurality of text segments;
the plurality of sets of tags comprises indications of the plurality of sets of entities and indications of the plurality of sets of topics;
the plurality of selectable inputs comprises a second plurality of selectable inputs associated with the plurality of sets of entities and a third plurality of selectable inputs associated with the plurality of sets of topics;
the generating the plurality of selectable inputs comprises formatting each selectable input of the second plurality of selectable inputs based upon a first format;

the generating the plurality of selectable inputs comprises formatting each selectable input of the third plurality of selectable inputs based upon a second format; and the first format is different than the second format.

19. The non-transitory machine readable medium of claim 18, wherein the identifying the plurality of sets of entities is performed based upon the plurality of sets of topics.

20. The non-transitory machine readable medium of claim 18, wherein the identifying the plurality of sets of topics is performed based upon the plurality of sets of entities.

* * * * *